United States Patent [19]
Adler et al.

[11] 3,727,708
[45] Apr. 17, 1973

[54] FORCE BALANCE WEIGH CELL

[75] Inventors: Alan J. Adler, Palo Alto; William S. Kennedy, San Jose, both of Calif.

[73] Assignee: Acurex Corporation, Sunnyvale, Calif.

[22] Filed: Dec. 20, 1971

[21] Appl. No.: 209,689

[52] U.S. Cl. ............... 177/178, 177/210, 177/212, 177/DIG. 6
[51] Int. Cl. ............................................. G01g 23/32
[58] Field of Search ............... 177/178, 210, 212, 177/229, 255, DIG. 6

[56] References Cited

UNITED STATES PATENTS

| | | | |
|---|---|---|---|
| 3,084,753 | 4/1963 | Handon | 177/212 X |
| 2,734,735 | 2/1956 | Payne | 177/DIG. 6 |
| 2,754,109 | 7/1956 | Eyraud et al. | 177/212 X |
| 2,584,949 | 2/1952 | Weckerly | 177/255 X |
| 3,494,435 | 2/1970 | Rouban | 177/255 X |

Primary Examiner—George H. Miller, Jr.
Attorney—Paul D. Flehr et al.

[57] ABSTRACT

A force balance weigh cell having a movable weight structure supported by a flexure system which allows only vertical movement, a photocell position sensing system provides an electrical output signal which is indicative of displacement of the weight structure, the signal is employed to develop a current which is proportional to displacement and rate of displacement and an electromagnetic means receive the signal and apply a restoring force to the weight support structure. The signal is a measure of the weight or force applied to the structure.

8 Claims, 6 Drawing Figures

ALAN J. ADLER,
WILLIAM S. KENNEDY
INVENTORS

BY Flehr, Hohbach, Test,
Albritton and Herbert

ATTORNEYS

FIG. 6

FORCE BALANCE WEIGH CELL

BACKGROUND OF THE INVENTION

This invention relates generally to a force balance weight cell.

Force measuring systems which include weight structures mounted for vertical motion and substantially fixed against radial motion are well known. However, such support systems are temperature sensitive and can be overloaded whereby they introduce an offset error. The systems of the prior art generally employ an electromagnetic sensor for sensing displacement of the weight structure.

OBJECTS AND SUMMARY OF THE INVENTION

It is a general object of the present invention to provide an improved force balance weigh cell.

It is another object of the present invention to provide a force balance weigh cell which includes a simple, stable position sensor.

It is another object of the present invention to provide a force balance weigh cell in which the weight structure includes an improved flexure support to support and guide the structure for vertical movement.

These and other objects of the invention are achieved by a force balance weigh cell including a movable weight structure supported by a five-element flexure support for movement in a vertical direction, means forming a light beam, a lens mounted on said structure to receive and focus said light beam, a photoelectric transducer means having a pair of sensitive areas for receiving the focused beam and positioned so that when the structure is in its normal location, the signal output from each of the sensitive areas is substantially equal and when the structure is displaced the output is unequal together with means for receiving said output signal and providing a signal which is proportional to displacement and rate of displacement, and means responsive to the signal for applying a force to the structure to oppose displacement and means for measuring the signal to provide an indication of the force applied to the support structure.

BRIEF DESCRIPTION OF THE DRAWINGS

FIG. 6 is a circuit diagram of the electrical circuit for receiving the output of the electro-optical system and serving to derive a restoring signal.

DESCRIPTION OF THE PREFERRED EMBODIMENT

Figure 2:
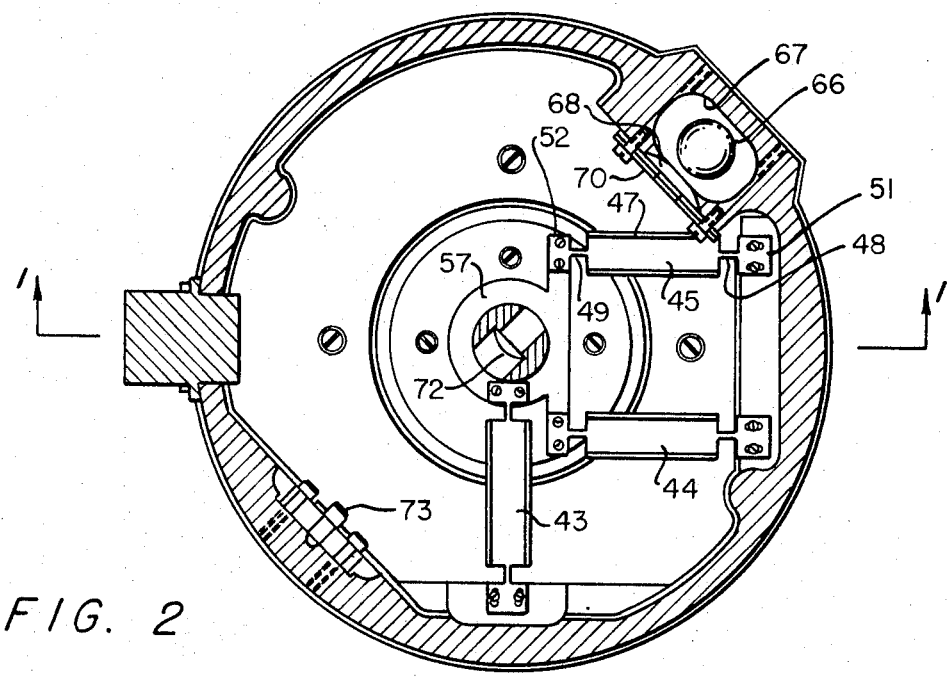
FIG. 2 is a sectional view taken along the line 2—2 of FIG. 1.

The weigh cell includes a housing 11 having a bottom closure plate 12 and a top closure plate 13 whereby to form an enclosed space 14. A weight structure 16 extends downwardly into the housing. The weight structure comprises a vertical column 15 which extends upwardly through the upper plate and is adapted to receive platform 17 which can receive a weigh cell table or other associated apparatus. The interior or enclosed space 14 is preferably sealed from the surroundings by a flexible seal 18 attached between retainer 19 and the top plate collar 21. The lower end of the column is suitably attached to a coil support 23 which supports coil 24 disposed in the gap 26. The gap is a permanent magnet gap formed by the pole pieces 28 and 29. The field is provided by permanent magnet 27. The magnetic structure is supported in the housing by means of screws 31 extending downwardly through the shelf 32 of the housing to engage the magnetic structure.

The weight structure or column is constrained for vertical movement by means of a five-element flexure system comprising the upper elements 41 and 42 and the lower elements 43, 44 and 45. The five elements are of identical design and include a stiff channel-shaped central portion 47 with necked-down portions 48 and 49 at each end and attachment portions 51 and 52, respectively, which are adapted to receive securing means such as screws for attachment to the housing at one end and column at the other end. The upper flexure members 41 and 42 are secured between the housing and the collar 56. The three lower elements 43, 44 and 45 are secured between the housing and the collar 57. It is to be noted that the upper elements are perpendicular to one another while two of the lower elements are parallel to one another with the other perpendicular to the two elements. The particular configuration of the five-element support allows vertical movement with minimal resistance while resisting rotating movement of the column or tilting movement of the column because of the forces applied by the flexure system. It is to be noted that the flexure elements approximate a frictionless linkage which is infinitely stiff in the radial direction, that is, in the direction of compression of the supports while affording great flexibility in the other direction, that is, the direction of vertical motion of the weight structure. The five supports form an essentially statically determinant support system which only allows vertical motion. The advantage of a statically determinant flexure system is that the influence of thermal growth of the support members on the vertical column force can be nearly eliminated. The attachment points of the two upper flexures are adjustable vertically by making the supporting block 61 adjustable in the vertical direction by means of the adjusting screws 62 and 63.

Figure 1:
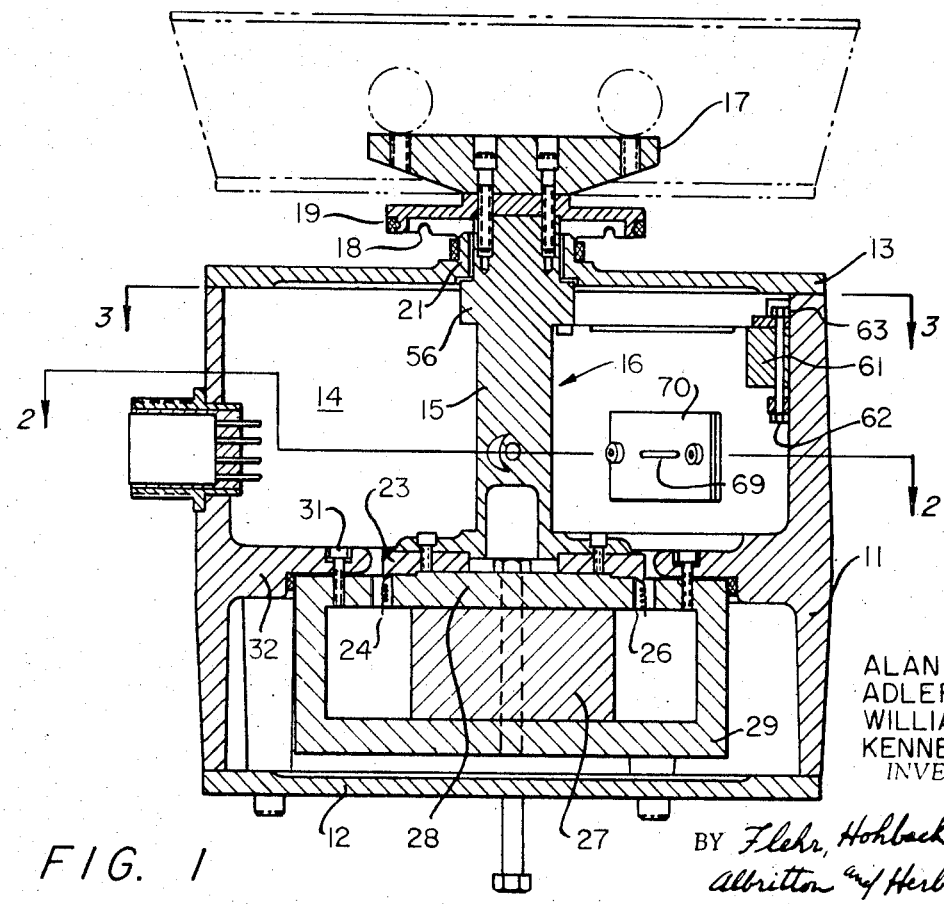
FIG. 1 is a sectional elevational view showing a force balance weigh cell in accordance with the invention.
Figure 4:
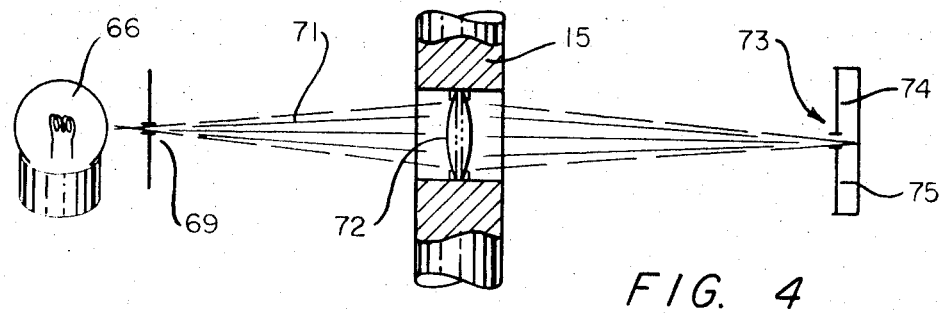
FIG. 4 is a schematic view of the electro-optical system.

In accordance with the present invention, there is provided a relatively simple temperature insensitive position sensor for the column. Referring particularly to FIGS. 1, 2 and 4, the position sensor includes a light source 66 mounted in a well 67 formed as a portion of the housing and having a mask 70 placed over the front opening 68. The mask includes a horizontal slit 69 which is adapted to project a narrow beam of light 71 (FIG. 4) towards the column. A lens 72 is mounted in the column and is adapted to receive the projected image of the illuminated slit. A split photoelectric transducer 73 is located on the opposite wall of the housing. The photoelectric elements of the transducer include two spaced sensitive areas 74, 75 which generate voltages when light impinges upon them.

When the column is in its normal or null position, the image of the slit is centered on the photoelectric transducers' two sensitive elements whereby the output from the two transducers is essentially or substantially equal. Any movement of the column will cause a difference in the amount of light impinging upon the photosensitive elements 74 and 75 and this causes a differential output signal. Thus, a relatively simple system has been devised for giving an indication of the vertical column location.

Figure 5:
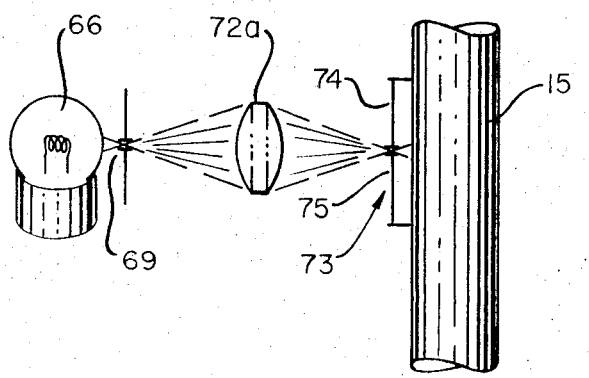
FIG. 5 is a schematic view of another embodiment of the electro-optical system.

FIG. 5 shows another position sensor. The position sensor employs the same parts as that just described and like reference numerals are employed. The difference is that the transducer 73 is presented for movement with the column and the lens 72a is stationary.

Figure 6:
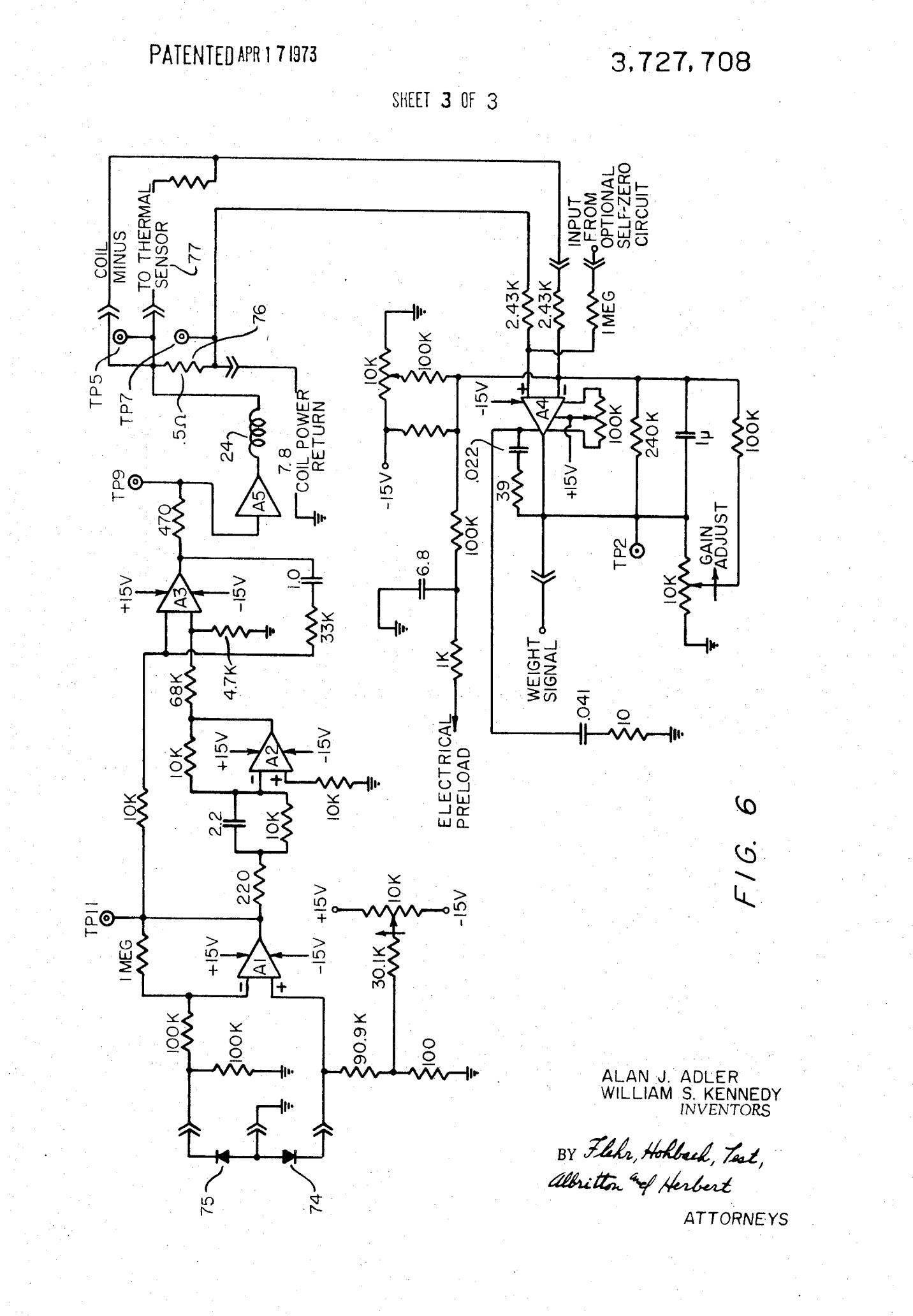

Referring to FIG. 6, the two photocells 74, 75 are shown as a part of the electronic circuit associated with the force balance weigh cell. Any difference in the output of the two photocells is amplified by differential amplifier A1. The output of the amplifier A1 is essentially a voltage proportional to the position of the movable column. The action of the feedback loop applying a restoring force to the column is to try to maintain the output of the amplifier A1 at zero volt which keeps the movable column always in the same position.

If a weight is placed on the weigh table or a force applied thereto, the movable column will move downward slightly providing a negative voltage at the output of the amplifier A1. This change in the voltage is sensed by a differentiating amplifier A2 and the output of A2 is a voltage proportional to the rate of change of the position of the column. This rate voltage is important in stabilizing the control loop. It is fed into a summing amplifier A3 along with the direct signal from the amplifier A1. The output of the summing amplifier drives a power transistor amplifier circuit A5 which supplies current to the coil 24 located in the gap 26.

The current generates a force which is linearly proportional to the amount of current in the coil. The action of the control loop is to supply whatever amount of current is required in order to maintain the movable weigh structure in its null position. All the current passing through the coil also passes through a precision resistor 76 which acts as a current measuring shunt. The voltage drop across the resistor is proportional to the current and thus the amount of force or weight applied to the column. The voltage across this resistor is amplified by a low drift amplifier A4 and the output of this amplifier is a voltage proportional to the force or weight on the platform.

In accordance with the present invention, the circuitry associated with the input to the amplifier A4 also includes a thermal sensor 77 which senses the temperature of the movable force coil and compensates for its thermally induced growth. For a given amount of current in the force coil, the force is proportional to the length of the coil times the magnetic flux density. The flux density is relatively constant but the length of the coil increases due to thermal expansion. For this reason, there is provided the thermal sensor which makes a minor correction to the input signal to the amplifier whereby to provide a temperature insensitive output signal.

Figure 3:
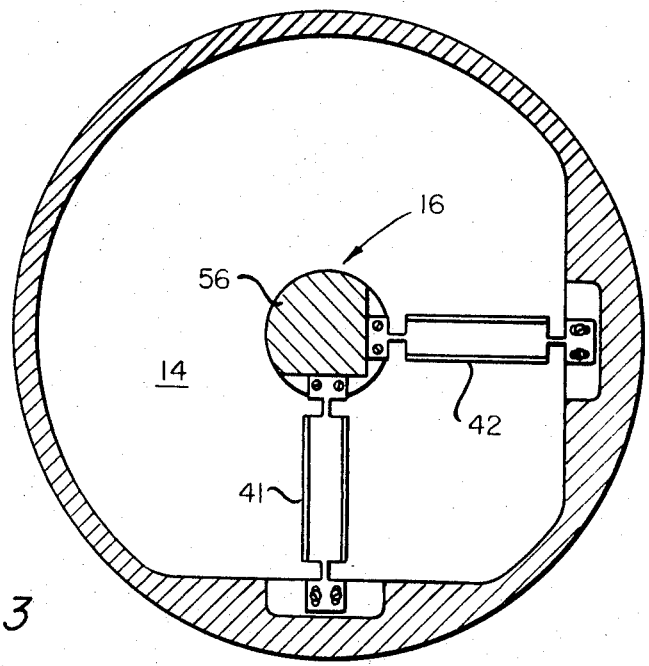
FIG. 3 is a sectional view taken along the line 3—3 of FIG. 1.

Apparatus was constructed in accordance with FIGS. 1, 2 and 3 and its output signals were fed to a circuit in which the circuit components were as indicated on FIG. 6. The weigh scale was capable of weighing 2 kilograms within 0.01 percent repeatability.

We claim:

1. A force balance weigh cell comprising a movable weigh structure, means for supporting said structure for movement in a vertical direction, means forming a beam of light, a lens mounted on said movable weigh structure to receive and focus said beam, a photocell including a pair of spaced sensitive photocell elements for receiving the focused beam positioned such that when the structure is in its normal position the signal output from each of the photocells is substantially equal and when the structure is displaced the output is unequal, means for receiving said displacement signals and providing an output signal which is proportional to displacement and rate of displacement, means responsive to the output signal to apply a restoring force to the structure, and means for measuring said output signal to give a force signal proportional to the force or weight on the weigh structure.

2. A force balance weigh cell as in claim 1 wherein said means for receiving the displacement signal and providing an output signal proportional to displacement and rate of displacement comprises a differential amplifier means for receiving and amplifying the signal, a differentiating amplifier connected to receive the output from the differential amplifier, and a summing amplifier adapted to receive the output of the differential amplifier and the differentiating amplifier and provide said output signal.

3. A force balance weigh cell as in claim 1 including a housing surrounding said weigh structure, a pair of support flexure elements connected between the housing and the weigh structure near one end of the weigh structure and housing and extending radially at right angles to one another away from the structure, and three flexure elements connected between the housing and the structure near the other end of the structure and housing, two of said members arranged parallel to one another and at right angles with respect to the other.

4. A force balance weigh cell as in claim 1 in which said means for supporting said structure for vertical movement comprises a five-element flexure system arranged and positioned to form a statically determinant support system.

5. A force balance weigh cell as in claim 4 including a magnet structure disposed below the weigh structure and a coil carried at the lower end of the support structure to cooperate with the magnetic structure and serving to receive the output signal and generate the restoring force.

6. A force balance weigh cell as in claim 5 including a thermal sensor mounted to sense the temperature at said coil and provide an output temperature signal and means for receiving said temperature signal and said force signal and correcting the force signal to compensate for thermal expansion of the coil.

7. A force balance weigh cell comprising a movable weigh structure, a five-element flexure system arranged and positioned to form a statically determinant support system for supporting said structure for movement in a vertical direction, means providing an output signal which is proportional to displacement and rate of displacement of said structure, means responsive to said signal to apply a restoring force to the structure, and means to measure said signal to apply a restoring force to provide an indication of weight.

8. A force balance weigh cell as in claim 7 including a housing surrounding said weigh structure, a pair of said flexure elements connected between the housing and the weigh structure near one end of the weigh structure and housing and extending radially at right angles to one another away from the structure, and three flexure elements connected between the housing and the structure near the other end of the structure and housing, two of said members arranged parallel to one another and at right angles with respect to the other.

* * * * *